(12) United States Patent
Lin et al.

(10) Patent No.: US 8,386,674 B2
(45) Date of Patent: Feb. 26, 2013

(54) METHODS AND SYSTEMS OF CONTROLLING AN ELECTRONIC DEVICE'S I/O TERMINALS USING PULSE-WIDTH MODULATION

(75) Inventors: Gaile Lin, Shenzhen (CN); Hong Guan, Shenzhen (CN); Chuanting Xu, Yichang (CN)

(73) Assignee: CSR Technology Inc., San Jose, CA (US)

( * ) Notice: Subject to any disclaimer, the term of this patent is extended or adjusted under 35 U.S.C. 154(b) by 150 days.

(21) Appl. No.: 12/279,310

(22) PCT Filed: Apr. 18, 2008

(86) PCT No.: PCT/CN2008/000806
§ 371 (c)(1),
(2), (4) Date: Aug. 13, 2008

(87) PCT Pub. No.: WO2009/127085
PCT Pub. Date: Oct. 22, 2009

(65) Prior Publication Data
US 2011/0149155 A1     Jun. 23, 2011

(51) Int. Cl.
*G06F 3/00* (2006.01)
*G06F 13/12* (2006.01)
*G06F 13/38* (2006.01)

(52) U.S. Cl. .............................................. 710/62; 710/8

(58) Field of Classification Search ........................ None
See application file for complete search history.

(56) References Cited

U.S. PATENT DOCUMENTS

| | | | | |
|---|---|---|---|---|
| 7,848,623 B2 * | 12/2010 | Dumont et al. | ............... | 386/201 |
| 2004/0041825 A1 * | 3/2004 | Willis | ........................... | 345/694 |
| 2006/0203814 A1 * | 9/2006 | Ye et al. | ........................ | 370/373 |
| 2006/0282185 A1 * | 12/2006 | Mallinson | ........................ | 700/94 |
| 2008/0272946 A1 * | 11/2008 | Melanson | ...................... | 341/143 |
| 2009/0039820 A1 * | 2/2009 | Milano et al. | .................. | 318/590 |
| 2009/0153075 A1 * | 6/2009 | Li et al. | ........................... | 315/294 |
| 2009/0213098 A1 * | 8/2009 | Du et al. | ........................ | 345/204 |

FOREIGN PATENT DOCUMENTS

| | | |
|---|---|---|
| CN | 1167311 A | 12/1997 |
| CN | 1207635 A | 2/1999 |
| CN | 1722813 A | 1/2006 |

OTHER PUBLICATIONS

SCART (Peritel; Euroconnector) connector pinout, pinouts.ru/Home/Scart_pinout.shtml, pp. 1-4, 1989.*
International Search Report & Written Opinion for International Application No. PCT/CN2008/000806, dated Feb. 5, 2009.

* cited by examiner

*Primary Examiner* — Kris Rhu
(74) *Attorney, Agent, or Firm* — Morgan, Lewis & Bockius LLP

(57) ABSTRACT

An electronic system includes a signal processor, a control signal generator, and an I/O interface. The signal processor has a first output signal and the first output signal is characterized by at least a first property and a second property. The control signal generator is configured to produce first and second control signals in accordance with the first and second properties of the first output signal, respectively. The I/O interface is configured to couple at least the first and second control signals to an output device. In some embodiments, the first output signal is a pulse width modulated signal having a software-specified pulse width and a software-specified repeat frequency. In some embodiments, the first property of the first output signal is the signal's duty cycle and the second property is the signal's frequency.

23 Claims, 7 Drawing Sheets

METHODS AND SYSTEMS OF CONTROLLING AN ELECTRONIC DEVICE'S I/O TERMINALS USING PULSE-WIDTH MODULATION

FIELD OF THE INVENTION

The present invention relates generally to the field of the I/O terminals of an electronic device, and in particular, to methods and systems of generating multiple control signals for the I/O terminals using pulse-width modulation (PWM).

BACKGROUND OF THE INVENTION

I/O terminals, digital or analog, exist in most electronic devices. Through its I/O terminals, an electronic device is able to communicate with other devices by transmitting signals between the devices. For example, a multimedia DVD player includes I/O terminals for transmitting various signals including video and audio signals. One or more cables are used for coupling the DVD player's I/O terminals to the I/O terminals of a display monitor such as a television. These I/O terminals usually follow one of the widely-adopted industry standards such as Syndicat des Constructeurs d'Appareils Radiorécepteurs et Téléviseurs (SCART).

SUMMARY

An electronic system includes a signal processor, a control signal generator, and an I/O interface. The signal processor has a first output signal and the first output signal is characterized by at least a first property and a second property. The control signal generator is configured to produce first and second control signals in accordance with the first and second properties of the first output signal, respectively. The I/O interface is configured to couple at least the first and second control signals to an output device.

In another embodiment, an electronic system includes a signal processor and a control signal generator coupled to the signal processor. The signal processor has a first output signal, which is characterized by at least a first property and a second property. The control signal generator is configured to produce first and second control signals in accordance with the first and second properties of the first output signal, respectively.

In another embodiment, a control signal generator is configured to receive an input signal from a signal processor. The input signal is characterized by at least a first property and a second property. The control signal generator includes a first control circuit and a second control circuit. The first control circuit is configured to produce a first control signal in accordance with the first property of the input signal. The second control circuit is configured to produce a second control signal in accordance with the second property of the input signal.

In yet another embodiment, a method of generating multiple control signals is performed by a control signal generator. After receiving an output signal from a signal processor, the control signal generator produces a first control signal and a second control signal in accordance with a first property and a second property of the output signal, respectively. The first property of the output signal is the output signal's duty cycle and the second property of the output signal is the output signal's frequency.

BRIEF DESCRIPTION OF THE DRAWINGS

The aforementioned features and advantages of the invention as well as additional features and advantages thereof will be more clearly understood hereinafter as a 15 result of a detailed description of preferred embodiments when taken in conjunction with the drawings.

Like reference numerals refer to corresponding parts throughout the several views of the drawings.

DESCRIPTION OF EMBODIMENTS

Figure 1A:
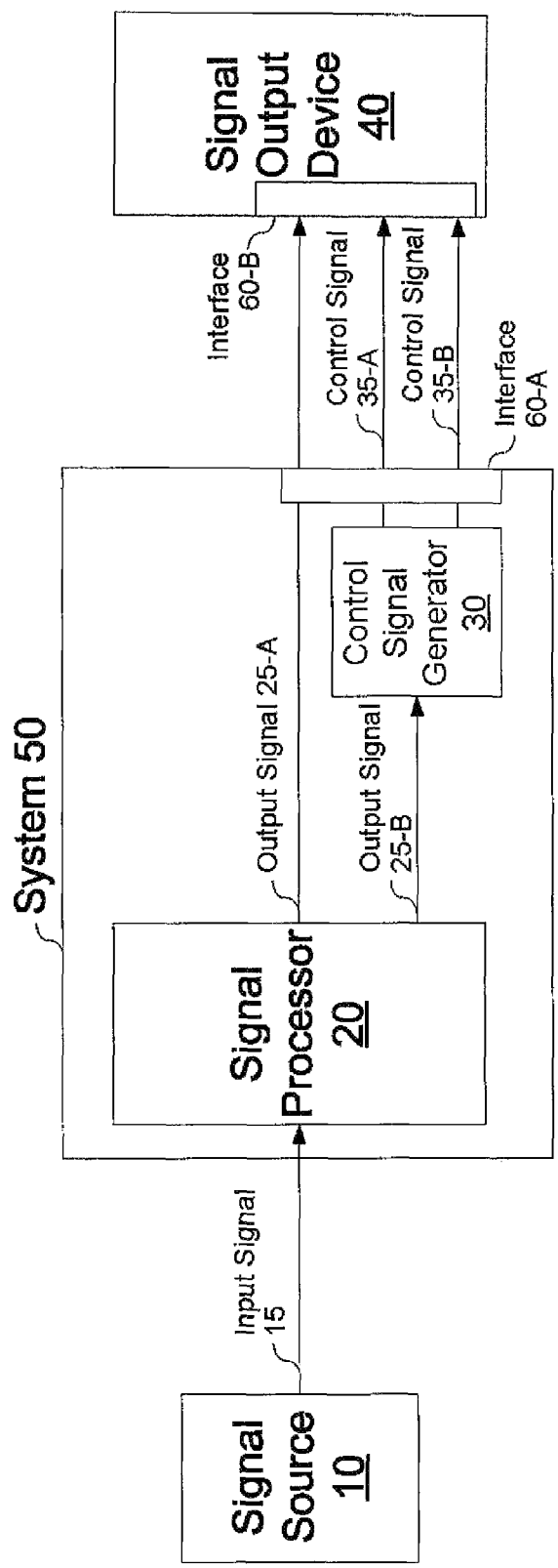
FIG. 1A is an overview block diagram of an electronic system coupled to a signal source and a signal output device, respectively, in accordance with some embodiments.

Reference will now be made in detail to embodiments, examples of which are illustrated in the accompanying drawings. In the following detailed description, numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

When the DVD player is turned on to replay a DVD disc through the display monitor, a multimedia signal processor in the DVD player produces video and audio signals from the disc and transmits the signals to the display monitor through the respective I/O terminals of both devices. The display monitor then presents on its screen images corresponding to the video signals and broadcasts sounds corresponding to the audio signals through one or more speakers. Besides the video and audio signals, the multimedia signal processor is also responsible for supplying multiple control signals to the display monitor through the I/O terminals. These control signals may define the formats of the video or audio signals, thereby enabling the display monitor to process the video and audio signals correctly.

The multimedia signal processor may be implemented in an integrated circuit (IC) that is encased in a plastic package. The package has multiple pins for the signal processor to exchange data with other components inside the DVD player and to receive power supplies from external power sources. If the signals produced by the signal processor each require a separate pin to be transmitted from the signal processor to the display monitor, the multimedia signal processor would need an IC package having a large pin count.

Although an IC package having a large pin count may support a multimedia signal processor that can realize many functions, such an IC package would have a large footprint on a printed circuit board. A large footprint is especially undesirable if the signal processor is used in a portable electronic device. Moreover, IC packages having large pin counts are more expensive than IC packages having fewer pins, thereby increasing the cost of the multimedia signal processor and the DVD player in which the multimedia signal processor is embedded. Conversely, an IC package without sufficient pins may not be able to output all the signals produced by a signal processor therein to support various functions.

As discussed in more detail below, one approach to solving this package-related problem is to have the signal processor export one signal corresponding to multiple signals through one pin. But such a signal cannot be directly transmitted to another device through the standard I/O terminals of the electronic system because the other device would be unable to discern the multiple signals therein. In this case, an additional circuit is needed to restore the multiple signals from the output signal and the multiple signals can then be transmitted to the other device through the standard I/O terminals.

FIG. 1A is an overview block diagram of an electronic system 50 coupled to a signal source 10 and a signal output device 40, respectively, in accordance with some embodiments.

The electronic system 50 includes a signal processor 20 and a control signal generator 30. The signal processor 20 receives at least an input signal 15 from the signal source 10 and produces at least two output signals 25-A, 25-B. The control signal generator 30 receives the output signal 25-B and produces at least two control signals 35-A, 35-B in accordance with the output signal 25-B. A more detailed description of the signal processor 20 and the control signal generator 30 is provided below in connection with FIGS. 1B and 1C. In some embodiments, the electronic system 50 includes an I/O terminal or interface 60-A, which has a counterpart 60-B in the signal output device 40. There are wired or wireless communication channels between the two I/O interfaces 60-A and 60-B. Both the output signal 25-A and the two control signals 35-A, 35-B are transmitted to the signal output device 40 through the communication channels.

In some embodiments, the electronic system 50 is a multimedia DVD player, which is either a standalone apparatus or integrated into another apparatus. The signal source 10 is a multimedia DVD disc accessible by the multimedia DVD player through a DVD disc drive. The signal output device 40 is a display monitor, one example of which is a television set. Both the multimedia DVD player and the display monitor have standard I/O terminals such as SCART connectors, which are coupled together by a cable.

Data obtained from the DVD disc is received by the multimedia signal processor in the DVD player in the form of the input signal 15. Exemplary data (obtained from the DVD disc) includes video and/or audio content stored in the DVD disc as well as relevant information on how to present the video and/or audio content. The multimedia signal processor is configured to process the input signal and produce corresponding video, audio, and control output signals. These output signals are sent to the display monitor through a standard I/O interface and presented to viewers as screen images corresponding to the video signals and sounds corresponding to the audio signals. In some embodiments, the control signals include information such as the video signal's display mode and color mode. The control signals enable the display monitor to operate correctly (e.g., to present the video and/or audio content in the manner intended by the published of the DVD disc).

Figure 1B:
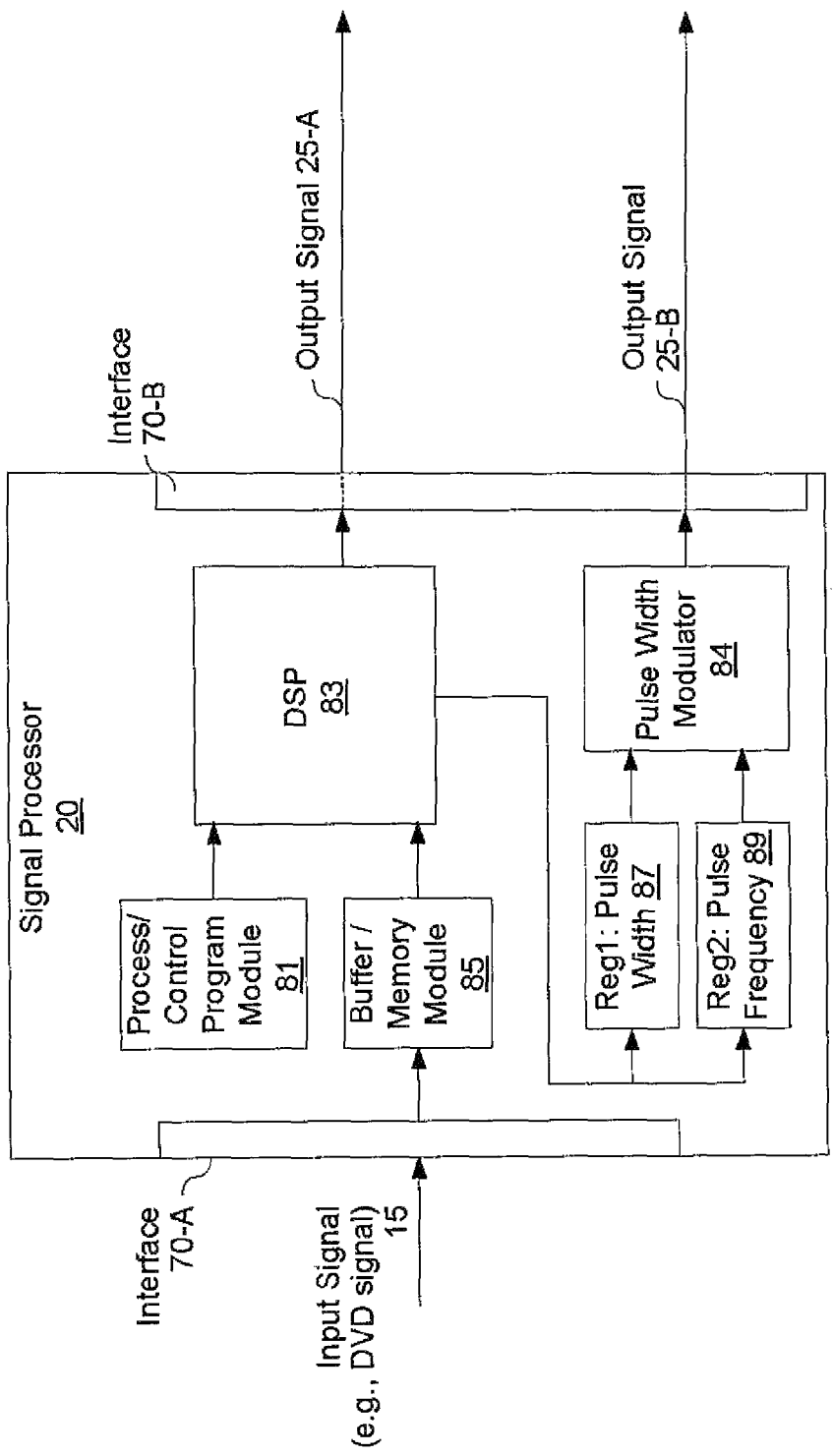
FIG. 1B is a block diagram of a signal processor within the electronic system in accordance with some embodiments.

FIG. 1B is a block diagram of the signal processor 20 within the electronic system 50 in accordance with some embodiments. The signal processor 20 includes at least two I/O interfaces, an I/O interface 70-A for receiving the input signal 15 from the signal source 10 and an I/O interface 70-B for exporting the output signals 25-A, 25-B produced by the signal processor 20. In some embodiments, the signal processor 20 includes a digital signal processor (DSP) 83, a data process/control program module 81, and a buffer or memory module 85. At runtime, the input digital signal 15 is first stored in the buffer or memory 85 before being processed by the DSP 83. The DSP 83 retrieves programs from the program module 81, loads the input signals from the buffer 85, and applies the retrieved programs to the input signals so as to produce various output signals 25-A, 25-B. These output signals are then transmitted to the other components through different pins of the IC package in which the signal processor 20 is embedded.

In some embodiments, to reduce pin usage, a single output signal (e.g., 25-B) is encoded with multiple output signals such that the multiple output signals leave the signal processor 20 through the same pin. For example, the signal processor 20 includes a pulse width modulator 84 and two registers, pulse width register 87 and pulse frequency register 89. By executing software programs to process the input signal 15, the DSP 83 determines a pulse width and a pulse frequency and saves these two parameters in the two registers 87 and 89. Based on the two parameters, the pulse width modulator 84 generates a pulse width modulated signal as the output signal 25-B, which is characterized by at least the two parameters.

In some embodiments, the pulse width and the pulse frequency correspond to two different control signals to be applied to the signal output device 40. The pulse width modulator encodes both control signals into a compound pulse width modulated signal. The DSP 83 can modify the compound signal and therefore the two control signals by updating the two parameters stored in the registers 87, 89. Meanwhile, the signal processor 20 only needs one pin rather than two pins for exporting the pulse width modulated signal. But as noted above, the signal output device 40 may not be able to interpret this compound control signal. Therefore, a control signal generator is necessary to restore the two control signals embedded in the compound signal.

Figure 1C:
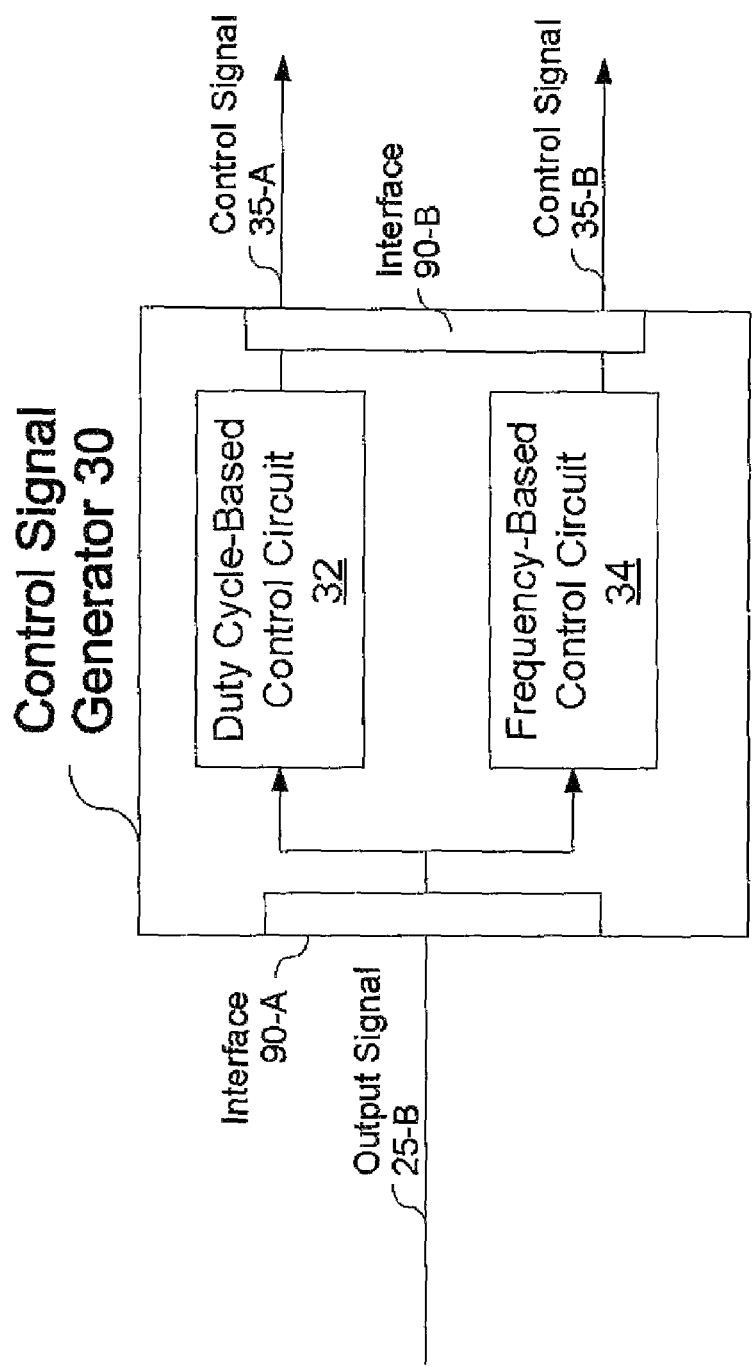
FIG. 1C is a block diagram of a control signal generator within the electronic system in accordance with some embodiments.

FIG. 1C is a block diagram of the control signal generator 30 within the electronic system 50 in accordance with some embodiments. Like the signal processor 20, the control signal generator 30 also includes at least two I/O interfaces, an I/O interface 90-A for receiving the output signal 25-B, i.e., the compound control signal, from the signal processor 20 and an I/O interface 90-B for exporting the two control signals 35-A, 35-B to the signal output device 40. In some embodiments, the control signal generator includes first and second control circuits, duty cycle-based control circuit 32 and frequency-based control circuit 34. The duty cycle-based control circuit 32 is configured to produce the output signal 35-A in accordance with the duty cycle of the pulse width modulated signal 25-B and the frequency-based control circuit 34 is configured to produce the output signal 35-B in accordance with the frequency of the pulse width modulated signal 25-B.

In some embodiments, the output signal 25-A is a video signal from a multimedia DVD player to a display monitor. The output 35-A defines the video signal's display mode and the output signal 35-B defines the video signal's color mode. For example, the multimedia DVD player often includes a standard SCART connector. Among others, the SCART connector typically includes (i) a pin that carries a low frequency signal representing the display mode of the video signal (also known as the "switch signal pin") and (ii) a pin that carries a signal representing the color mode of the video signal (also known as the "blanking signal pin").

Specifically, the video signal has one of the following three display modes based on the voltage at the switch signal pin:
No DVD signal from the DVD player to the display monitor if the voltage is between 0 V and 2.5 V;
A widescreen (16:9) DVD signal if the voltage is between 4.5 V and 7 V (corresponding to nominal voltage of 6 V); and
A normal (4:3) DVD signal if the voltage is between 9.5 V and 12 V (corresponding to nominal voltage of 12 V).

Similarly, the video signal may have one of the following two color 5 r modes based on the voltage at the blanking signal pin:
Composite video blanking and sync (CVBS) mode if the voltage is between 0 V and 0.4 V; and
RGB mode if the voltage is between 1 V and 3 V (corresponding to nominal voltage of 1 V).

From a specific pulse width modulated signal 25-B, the duty cycle-based control circuit 32 generates a voltage output that is dependent upon the modulated signal's duty cycle. The amplitude of the voltage output indicates the corresponding video signal's display mode. From the same pulse width modulated signal 25-B, the frequency-based control circuit 34 generates a voltage output that is dependent upon the repeat frequency of the compound signal; this voltage output represents the corresponding video signal's color mode.

Figure 2:
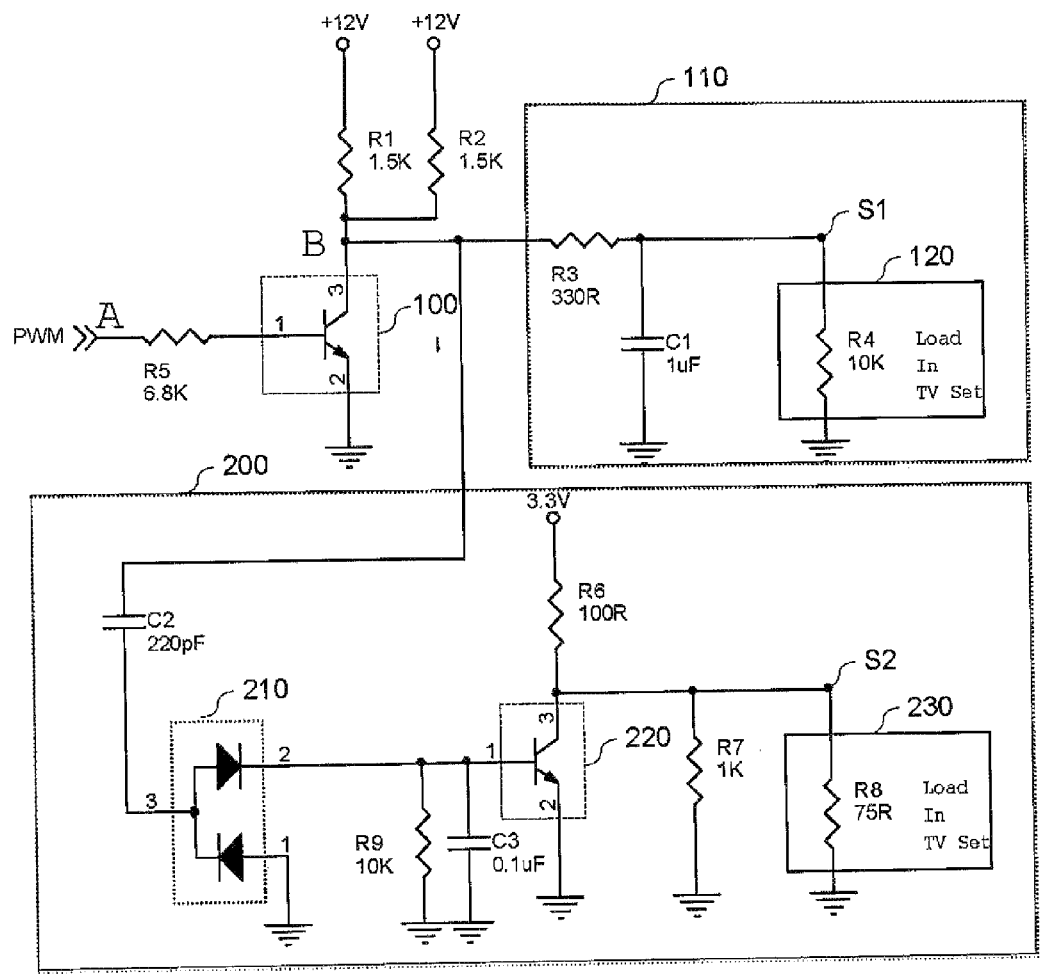
FIG. 2 is a circuit diagram of the control signal generator that includes a duty cycle-based control circuit and a frequency-based control circuit in accordance with some embodiments.

FIG. 2 is a circuit diagram of the control signal generator 30 that includes a duty cycle-based control circuit 110 and a frequency-based control circuit 200 in accordance with some embodiments. The pulse width modulated (PWM) signal is applied to the base terminal A of a bipolar junction transistor 100. The corresponding signal at the collector terminal B of the transistor 100 is then applied to the duty cycle-based control circuit 110 and the frequency-based control circuit 200. The output at S1 (control signal 35-A in FIG. 1C) is a display mode control signal. Component 120 represents the load presented by a display monitor when connected to control signal 35-A of the system 50 (FIG. 1A), and thus component 120 is not part of the control signal generator 30. The output at S2 (control signal 35-B in FIG. 1C) is a color mode control signal. Component 230 represents the load presented by a display monitor when connected to control signal 35-B of the system 50 (FIG. 1A), and thus component 230 is not part of the control signal generator 30.

Figure 3:
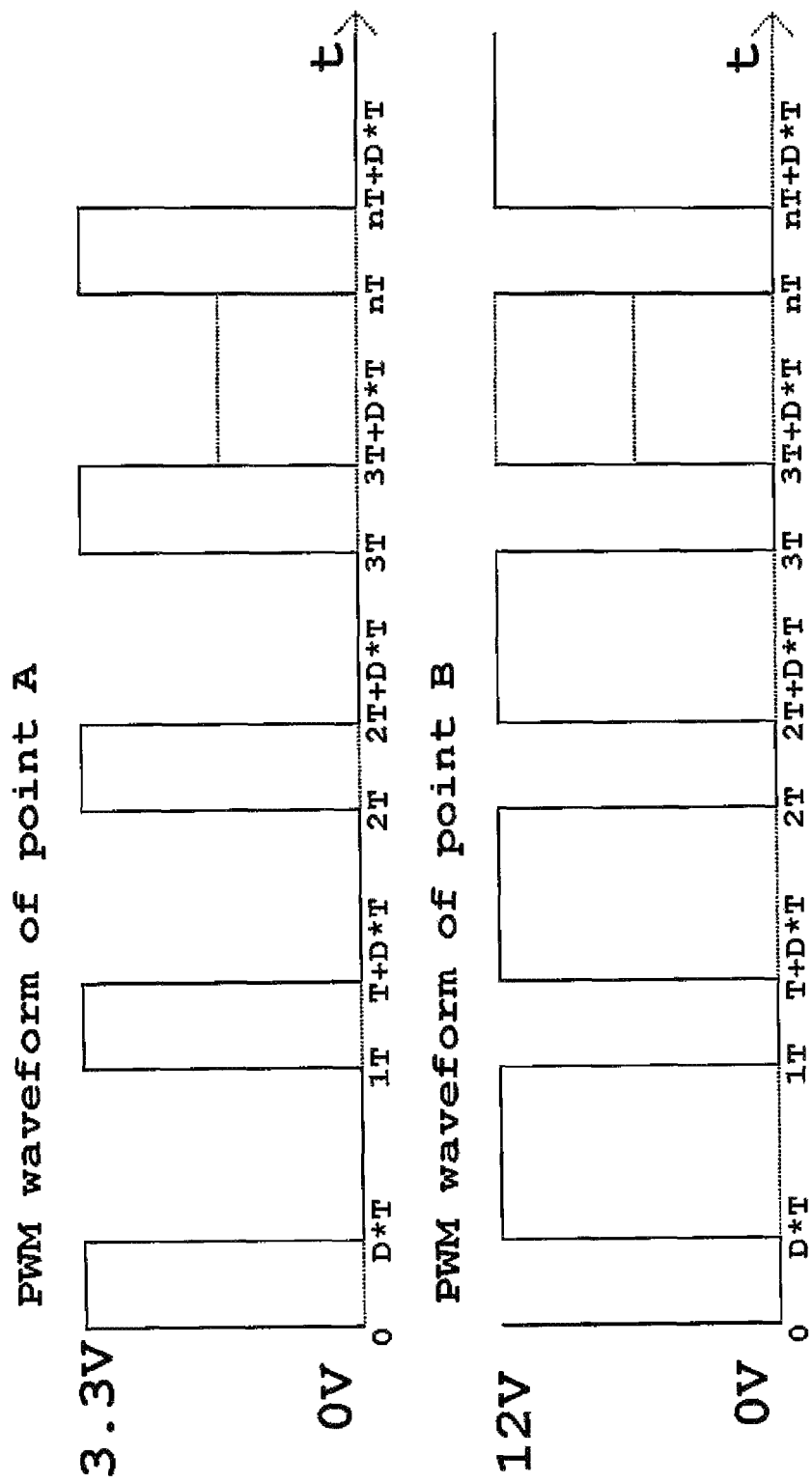
FIG. 3 is a block diagram of two periodic waveforms at two locations in the circuit diagram of the control signal generator in accordance with some embodiments.

FIG. 3 is a block diagram of two periodic waveforms at two locations, A and B, in the circuit diagram (see FIG. 2) of the control signal generator 30 in accordance with some embodiments. The transistor 100 is both (a) an inverter (note the 180-phase-shift between the two waveforms) and (b) an amplifier (note that the amplitude of the signal at point B is nearly four times the amplitude of the signal at point A).

In a periodic phenomenon, the ratio of the duration ($\tau$) of the phenomenon in a given period (T) is defined as the phenomenon's "duty cycle":

$$D=\tau/T.$$

Where
D is the so-called duty cycle;
$\tau$ is the duration that the function or phenomenon is non-zero; and
T is the period of the function or phenomenon.

Figure 4A:
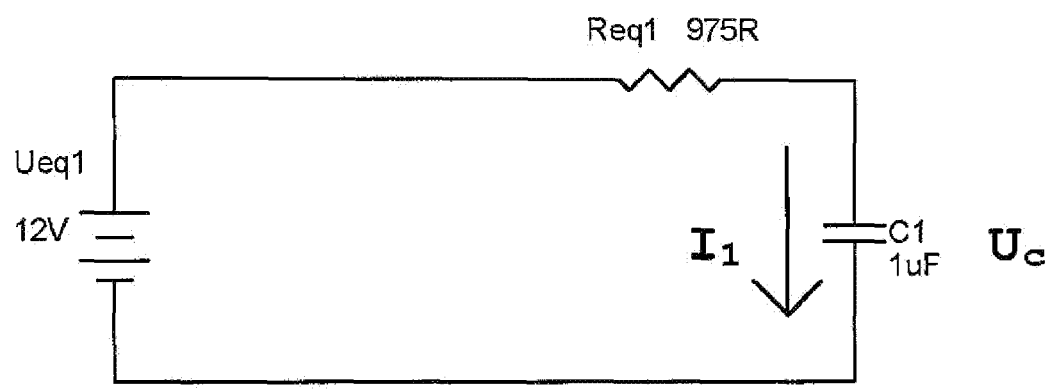
FIGS. 4A and 4B are two circuit diagrams of the duty cycle-based control circuit in FIG. 2, when subject to different input signals, in accordance with some embodiments.
Figure 4B:
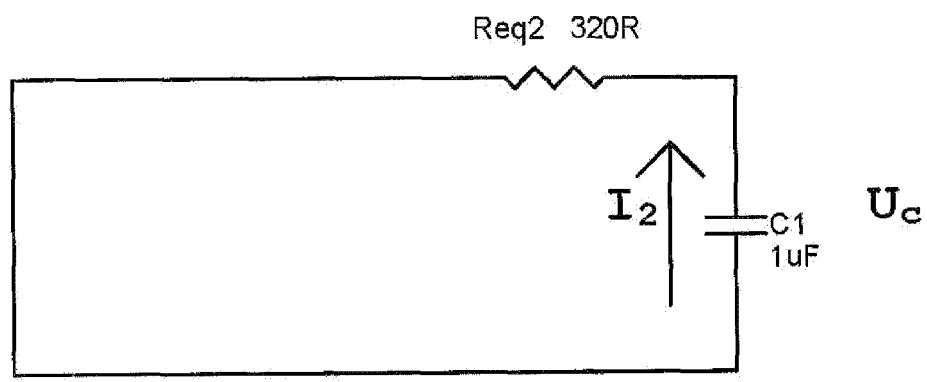

FIGS. 4A and 4B are schematic circuit diagrams of the duty cycle-based control circuit 110 (see FIG. 2), when subject to different input signals, in accordance with some embodiments.

In particular, the circuit diagram in FIG. 4A corresponds to the time period $D*T<t<T$ when the transistor 100 turns off. In this case, a 12 V voltage $U_{eq1}$ is applied to the duty cycle-based control circuit 110 and an average current $I_1$ charges the capacitor C1. According to Ohm's law, the average current $I_1$ is defined as:

$$I_1=(12V-U_c)/R_{eq1}$$

where
is the voltage across capacitor C1; and
$R_{eq1}$ is the resistance of the remainder of the circuit at least partially due to the parallel resistance of the load as viewed from the terminal of capacitor C1 that is not connected to circuit ground.

The circuit diagram in FIG. 4B corresponds to the time period $0<t<D*T$, during which time the transistor 100 turns on and the collector terminal B is pulled down to the ground level.

In this case, there is no external power applied to the duty cycle-based control circuit 110. An average current $I_2$ flows through the circuit to release the electric energy previously accumulated by the capacitor C1 during the time period $D*T<t<T$. According to Ohm's law, the average current $I_2$ is defined as:

$$I^2=U_c/R_{eq2}.$$

where $R_{eq2}$ is resistance of the remainder of the circuit at least partially due to the parallel resistance of the load as viewed from the terminal of capacitor C1 that is not connected to circuit ground.

Note that the amount of electric charge accumulated at the capacitor C1 during the time period $D*T<t<T$ equals to the amount of electric charge released from the capacitor C1 during the time period $0<t<D*T$, $$I_1*(1-D)=I_2*D.$$

Therefore, the amplitude of the average voltage across the capacitor C1, which is also the average voltage at the point S1 in FIG. 2, is defined as:

$$U_c=12*R_{eq2}*(1-D)/[R_{eq1}*D+R_{eq2}*(1-D)].$$

Since $U_c$ depends on the duty cycle of the PWM signal, but not the repeat frequency of the PWM signal, it is possible to select a duty cycle for the PWM signal that indicates the video signal's display mode (using the circuitry of FIG. 1B), and to detect the duty cycle of the PWM signal and convert it into a display mode control signal (e.g., voltage $U_c$) using the duty cycle-based control circuit 110.

By contrast, the output voltage at the point S2 of the frequency-based control circuit 200 in FIG. 2 varies with the frequency of the PWM signal. For example, when the frequency of the PWM signal is about 496 kHz, after half-wave rectification by the rectifier 210 and filtering by the capacitor C3, there is still enough current flowing into the base terminal of bipolar junction transistor 220 to turn on the bipolar junction transistor 220. Because the transistor 220 operates as an inverter, a low voltage output (nearly zero) occurs at the point S2 when transistor 220 is on. But when the frequency of the PWM signal is only about 24.5 kHz, the current after rectification is too small (relative to high frequency mode) to turn on the transistor 220. As a result, the voltage at the point S2 is pulled up to a high voltage by the resistor R6. Thus, it is possible to select the repeat frequency for the PWM signal to generate a signal indicating the video signal's color mode using the frequency-based control circuit 200.

Table 1 below illustrates experimental results produced when a control signal generator 30 as shown in FIG. 2 receives an input PWM signal having the properties (frequency and duty cycle) shown in each row of the table and produces two control signals that are transmitted to a display monitor via an SCART connector.

TABLE 1

The SCART pin status and detailed test data

| Switch Signal Pin | Blanking Signal Pin | PWM Frequency | PWM Duty Cycle | Switch Signal Pin Test Data | Blanking Signal Pin Test Data |
|---|---|---|---|---|---|
| 0~2.5 V (TV mode) | 1~3 V (RGB) | 24.5 KHz | 97% | 0 V | 1.3 V |
| 4.5~7 V (16:9) | 1~3 V (RGB) | 24.5 KHz | 23% | 5.8 V | 1.2 V |
| 9.5~12 V (4:3) | 1~3 V (RGB) | 24.5 KHz | 0.2% | 11.5 V | 1.3 V |
| 0~2.5 V (TV mode) | 0~0.4 V (Composite) | 496 KHz | 45% | 0.8 V | 0 V |
| 4.5~7 V (16:9) | 0~0.4 V (Composite) | 496 KHz | 31% | 5.5 V | 0 V |
| 9.5~12 V (4:3) | 0~0.4 V (Composite) | 496 KHz | 9% | 10.8 V | 0.15 V |

For the switch signal pin, the test data falls into three possible ranges solely based on the duty cycle of the PWM signal such that the higher the duty cycle, the lower the voltage output regardless of the signal's frequency.

By contrast, for the blanking signal pin, the test data falls into two possible ranges solely based on the frequency of the PWM signal such that the higher the frequency, the lower the voltage output regardless of the signal's duty cycle.

Figure 5:
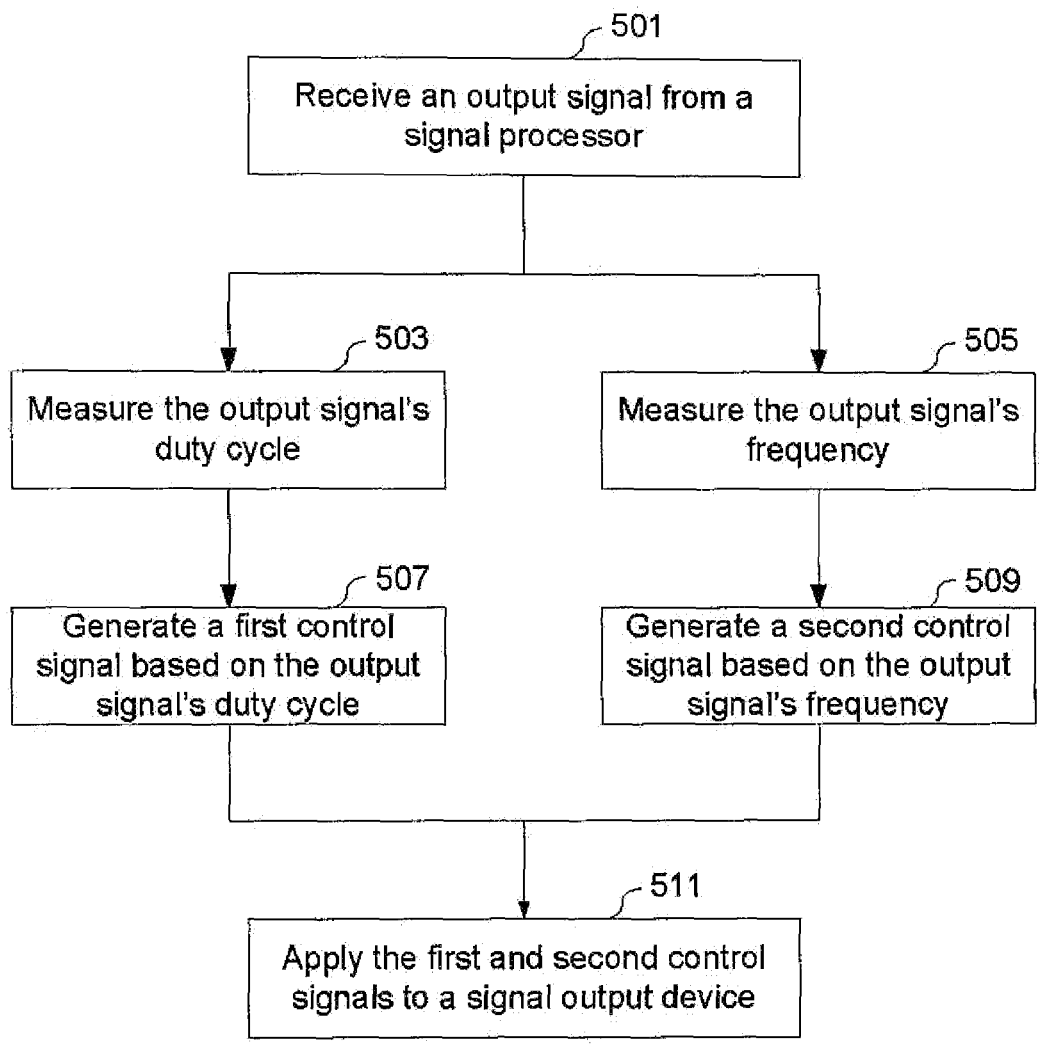
FIG. 5 is a flow chart of a process of simultaneously generating multiple control signals using the control signal generator in accordance with some embodiments.

FIG. 5 is a flow chart of a process of simultaneously generating multiple control signals using the control signal generator in accordance with some embodiments.

After receiving an output signal from a signal processor (501), the control signal generator measures or determines different properties of the output signal, including the output signal's duty cycle (503) and the output signal's frequency (505). Based on the measurements or determinations made by the control signal generator, the control signal generator produces a first control signal based on the measured duty cycle (507) and a second control signal based on the measured frequency (509). Next, the control signal generator applies the two control signals to a signal output device (511), e.g., through a standard I/O terminal such as an SCART connector.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. For example, it is possible to implement the process as shown in FIG. 5 using a digital microprocessor rather than an analog circuit as shown in FIG. 2. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic system, comprising:
a signal processor, wherein the signal processor has a first output signal and the first output signal is characterized by at least a duty cycle and a frequency; and
a control signal generator including a first circuit and a second circuit, wherein the control signal generator is configured to concurrently produce first and second control signals such that the first circuit is configured to produce the first control signal in accordance with the duty cycle of the first output signal, and the second circuit is configured to produce the second control signal in accordance with the frequency of the first output signal; and
an I/O interface to couple at least the first and second control signals to an output device.

2. The electronic system of claim 1, wherein the signal processor is configured to produce the first output signal as a pulse width modulated signal having a software-specified pulse width and a software-specified repeat frequency.

3. The electronic system of claim 1, wherein the I/O interface is a SCART connector and the output device is a display monitor.

4. An electronic system, comprising:
a signal processor, wherein the signal processor has a first output signal and the first output signal is characterized by at least a duty cycle and a frequency; and
a control signal generator including a first circuit and a second circuit, wherein the control signal generator is configured to concurrently produce first and second control signals such that the first circuit is configured to produce the first control signal in accordance with the duty cycle of the first output signal, and the second circuit is configured to produce the second control signal in accordance with the frequency of the first output signal.

5. The electronic system of claim 4, further including an I/O interface to couple the electronic system to a signal output device, wherein
the first and second control signals and at least a second output signal from the signal processor are submitted to the signal output device through the I/O interface, and
the signal output device is configured to process the second output signal in accordance with the first and second control signals.

6. The electronic system of claim 5, wherein the second output signal is a video signal, the first control signal is a signal defining the video signal's display mode and the second control signal is a signal defining the video signal's color mode.

7. The electronic system of claim 5, wherein the I/O interface is a SCART connector and the signal output device is a display monitor.

8. The electronic system of claim 5, wherein the signal processor is configured to produce the first and second output signals in accordance with content obtained from a multimedia signal source.

9. The electronic system of claim 8, wherein the multimedia signal source is a DVD disc.

10. The electronic system of claim 4, wherein the signal processor is configured to produce the first output signal as a pulse width modulated signal having a software-specified pulse width and a software-specified repeat frequency.

11. A control signal generator receiving an input signal, wherein the input signal is characterized by at least a duty cycle and a frequency, comprising:
a first control circuit, wherein the first control circuit is configured to produce a first control signal based on a value of the duty cycle of the input signal; and a second control circuit, wherein the second control circuit is configured to produce a second control signal, concurrently with production of the first control signal, the second control signal based on a value of the frequency of the input signal.

12. The control signal generator of claim 11, wherein the first and second control signals are submitted to the signal output device through an I/O interface coupling the control signal generator to a signal output device, and the signal output device is configured to produce an output signal in accordance with the first and second control signals.

13. The control signal generator of claim 12, wherein the output signal is a video signal, the first control signal is a signal defining the video signal's display mode and the second control signal is a signal defining the video signal's color mode.

14. The control signal generator of claim 12, wherein the signal connector is a SCART connector and the signal output device is a display monitor.

15. The control signal generator of claim 11, wherein the control signal generator is configured to receive the input signal from a signal processor and the signal processor is configured to produce the input signal in accordance with content obtained from a multimedia signal source.

16. The control signal generator of claim 15, wherein the multimedia signal source is a DVD disc.

17. The control signal generator of claim 15, wherein the signal processor is configured to produce the input signal as a pulse width modulated signal having a software-specified pulse width and a software-specified repeat frequency.

18. A method of generating multiple control signals, comprising:
receiving an output signal from a signal processor, wherein the output signal is characterized by at least a duty cycle and a frequency;
generating a first control signal based on a value of the duty cycle of the output signal; and
generating a second control signal, concurrently with generation of the first control signal, the second control signal based on a value of the frequency of the output signal.

19. The method of claim 18, further comprising:
applying the first and second control signals to a signal output device, wherein the signal output device is configured to produce a second output signal in accordance with the first and second control signals.

20. The method of claim 19, wherein the second output signal is a video signal, the first control signal is a signal defining the video signal's display mode and the second control signal is a signal defining the video signal's color mode.

21. The method of claim 18, wherein the signal processor is configured to produce the output signal in accordance with content obtained from a multimedia signal source.

22. The method of claim 21, wherein the multimedia signal source is a DVD disc.

23. The method of claim 18, wherein the signal processor is configured to produce the output signal as a pulse width modulated signal having a software-specified pulse width and a software-specified repeat frequency.

* * * * *